United States Patent [19]
Bauer et al.

[11] 3,791,824
[45] Feb. 12, 1974

[54] CONJUGATED POLYMERS IN ELECTROPHOTOGRAPHY

[75] Inventors: Wolfgang G. Bauer, Korntal, Germany; Ulrich T. Mueller-Westerhoff, Monte Sereno, Calif.

[73] Assignee: International Business Machines Corporation, Armonk, N.Y.

[22] Filed: Feb. 20, 1973

[21] Appl. No.: 333,829

[52] U.S. Cl................. 96/1.5, 252/501, 260/67 R, 96/1.6
[51] Int. Cl. .......................... G03g 5/04, G03g 7/00
[58] Field of Search ....... 96/1.5; 252/501; 260/67 R

[56] References Cited
UNITED STATES PATENTS

| | | | |
|---|---|---|---|
| 3,287,123 | 11/1966 | Hoegl | 96/1.5 |
| 3,421,891 | 1/1969 | Inami et al. | 96/1.5 |
| 3,655,378 | 4/1972 | Contois et al. | 96/1.5 |
| 3,752,668 | 8/1973 | Baltazzi | 96/1.5 |

*Primary Examiner*—Roland E. Martin, Jr.
*Assistant Examiner*—J. P. Brammer

[57] ABSTRACT

Poly-2,9-methylenefluorene, fully conjugated via 9-methylenefluorene repeating units, has been found to be a useful photoconductor in electrophotographic processes.

4 Claims, No Drawings

CONJUGATED POLYMERS IN ELECTROPHOTOGRAPHY

FIELD OF THE INVENTION

This application is concerned with poly-2,9-methylenefluorene and its use in electrophotography as a photoconductor.

PRIOR ART

Photoconductive polymers have been known in the past, e.g., U. S. Pat. Nos. 3,037,861; 3,232,775 and 3,655,378. The polymer of the present invention, however, is different in chemical structure from any previously known.

SUMMARY OF THE INVENTION

It has now been found that poly-2,9-methylenefluorene may be prepared by the base-catalyzed polycondensation of fluorene-2-carboxaldehyde. The equation for this reaction is as follows:

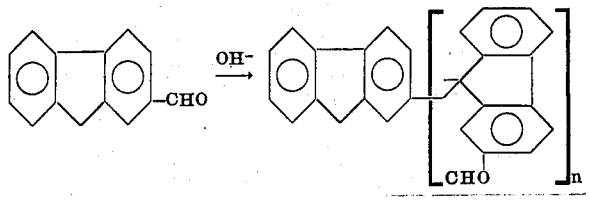

Poly-2,9-methylenefluorene can be dissolved in many organic solvents and can be dried as a layer on a support as a clear film. It has the mechanical properties desirable in film forming polymers to make it suitable for use in electrophotographic processes. To form photoconductive layers, the polymers of the present invention are dissolved in a suitable solvent such as tetrahydrofuran and coated by such methods as spray coating, dip coating, doctor blade, etc., onto a suitable substrate.

The photoconductive coatings can be chemically sensitized to increase the level of sensitivity to light of a given wave length. Preferred sensitizing compounds for this purpose comprise 9-dicyanomethylene-2,4,7-trinitrofluorene, 2,4,7-trinitrofluorenone (TNF), 3,5-dinitrobenzoic acid, tetrachlorophthalic anhydride, tetranitronaphthalene, tetracyanoethylene 2,4,7-trinitrophenanthroquinone and related compounds. In general, the preferred sensitizers are electron accepting compounds, also known as Lewis acids.

There are several well known electrophotographic reproduction processes in current use. They differ in the particular way in which they are carried out, particularly the sequence in which electric charging (usually with a corona) and illumination are carried out. All electrophotographic reproduction processes, however, involve the process step of selectively rendering portions of a photoconductor electrically conductive by selective exposure to light. The polymers of the present invention are very well suited for use in electrophotography because of their photoconductivity and their desirable film forming characteristics. The preferred activator for each use, and the preferred amount thereof, are readily determined by routine testing.

While the invention has been particularly shown and described with reference to preferred embodiments thereof, it will be understood by those skilled in the art that various changes in the form and details may be made therein without departing from the spirit and scope of the invention.

EXAMPLE I

Preparation of poly-2,9-methylenefluorene

To a suspension of potassium ethoxide in tetrahydrofurane (THF) prepared from 1.95 g (50 mmoles) potassium and 2.8 g (60 mmoles) absol. ethanol in 10 ml absol. THF, a solution of 9.7 g (50 mmoles) flourene-2-carboxaldeyde in 60 ml absol. THF was added at room temperature. After stirring this mixture for 48 hrs. the solution was filtered from 0.8 g THF-insoluble material. On addition of 500 ml ether to the yellow THF solution a yellow polymer precipitated, which was washed with water and ether, respectively. After vacuum drying and reprecipitation from methylene chloride/hexane 7.5 g (85%) of yellow polymer, no melting to 300°C, slow darkening>300°C, were obtained. GPC analysis gave the follwoing molecular weight distribution: $M_n$=1740, $M_w$= 2380, $M_w/M_n$=1.37.

Calcd. for $(C_{14}H_{10}O).(C_{14}H_8)_{12}$: C 94.71 H 4.60 0 0.69
Found : 94.36 4.76

NMR spectrum in $CDCl_3$: $1.6\tau - 3.6\tau$ broad absorption

IR spectrum (KBr): 1715 cm C = O
1620 cm Exocyclic C = C
1595 cm

UV spectrum in $CHCl_3$: $\lambda_{max}$= 265,360 nm

EXAMPLE II

The polycondensation product of Example I showed effective photoconduction properties together with good charge acceptance, especially in a negative mode, and especially with the addition of sensitizers. The following table summarizes the photoconductive and electrophotographic properties of the polymer, without and with the activators 9-dicyanomethylene-2,4,7-trinitrofluorenone (DCMF) and 2,4,7-trinitrofluorenon (TNF):

| System | Negative Mode | | Positive Mode | |
| --- | --- | --- | --- | --- |
| | Charge Acceptance | $T_{1/2}$ (full) | Charge Acceptance | $T_{1/2}$ (full) |
| (1) no activator | 150 V | — | 145 V | — |
| (1) : DCMF (1:0.5) | 5.5 V | 0.2 sec | — | — |
| (1): DCMF (1:0.1) | 80 V | 0.7 sec | 70 V | 1.2 sec |
| (1): TNF (1:1) | 530 V | 0.15 sec | 270 V | 0.7 sec |

The method of evaluation was:
a. a 10% by weight solution of (1) in THF was made,
b. the activator, (DCMF) or (TNF), was added in the ratio noted in the table on a weight basis, c. application was on the Camag coater to offset aluminum using a 3 mil doctor blade wet gap; the films were dried over night at 50°C, d. the films were tested on the rotating disc electrometer.

What is claimed is:

1. In an electrophotographic reproduction process which comprises selectively rendering portions of a photoconductor electrically conductive by selective exposure to light, the improvement according to which the photoconductor comprises poly-2,9-methylenefluorene.

2. A process as claimed in claim 1 wherein the photoconductor also comprises an electron accepting activator.

3. A process as claimed in claim 2 wherein the activator is 9-dicyanomethylene-2,4,7-trinitrofluorene.

4. A process as claimed in claim 2 wherein the activator is 2,4,7-trinitro-9-fluorenone.

* * * * *